H. E. GOLDBERG.
CALCULATING MACHINE.
APPLICATION FILED SEPT. 20, 1911.
1,112,063.
Patented Sept. 29, 1914.
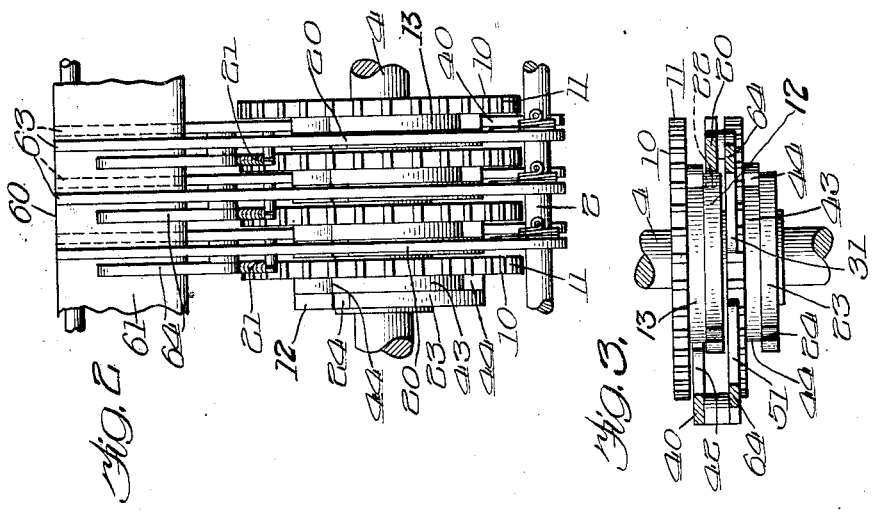
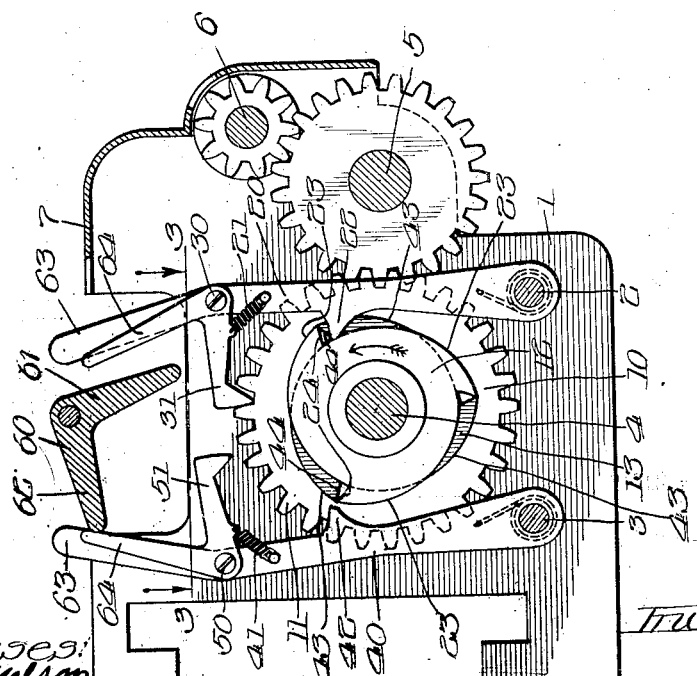
Witnesses:
Jno. H. Nelson
Edward Nelson
Inventor:
Hyman E. Goldberg

UNITED STATES PATENT OFFICE.

HYMAN ELI GOLDBERG, OF CHICAGO, ILLINOIS, ASSIGNOR TO GOLDBERG CALCULATING MACHINE COMPANY, OF CHICAGO, ILLINOIS.

CALCULATING-MACHINE.

1,112,063.　　　　　Specification of Letters Patent.　　Patented Sept. 29, 1914.

Application filed September 20, 1911. Serial No. 650,361.

*To all whom it may concern:*

Be it known that I, HYMAN ELI GOLDBERG, a citizen of the United States, residing at Chicago, in the county of Cook and State of Illinois, have invented certain new and useful Improvements in Calculating-Machines, of which the following is a specification.

My invention is a new totalizer and particularly a new means for carrying the tens both for addition and subtraction.

The invention is illustrated by the drawings of which—

Figure 1 represents an end elevation of a totalizer showing my invention. Fig. 2 is a front elevation of the same with the covers removed, and Fig. 3 shows two carrying wheels and their coöperating mechanism to more clearly illustrate their construction and operation.

In general the machine is of the same nature as the one shown in Patent No. 893,719 issued to John C. Wahl, July 21, 1908, and now on the market under the name, Wahl adding machine. It will therefore be unnecessary to describe it in detail as such description can be found in the above cited patent. The totalizer however is completely different from the one there shown and it will therefore be explained in detail.

The totalizer is composed of two side walls 1 which support the adding power lever shaft 2, the subtracting power lever shaft 3, the carrying wheel shaft 4, the idler gear shaft 5, the numeral wheel shaft 6, and the cover 7. These shafts and cover unite the two side walls and help to support the mechanism of the totalizer.

Mounted upon the carrying wheel shaft 4 are the carrying wheels 10, each of which is composed of a 30-toothed gear 11, a 3-lobed adding carrying cam 12 and a 3-lobed subtracting carrying cam 13. The 30-toothed gear and the two carrying cams are rigidly fastened together. The two carrying cams are equal but placed to face opposite each other so that one acts in one direction and the other acts in the opposite direction.

Mounted upon the adding power lever shaft 2 are a set of power levers 20, one for each carrying wheel. Each adding power lever has wound around its hub a spring 21 one end of which is fastened to the power lever and the other end of which is fastened to the shaft 2. The power levers 20 are thus given continually a tendency to have their noses 22 brought in toward the carrying wheel shaft 4, but are prevented from doing so by the contact of the noses 22 with the adding carrying cams 12. Upon an examination of Fig. 1, it will be seen that each carrying cam is provided with three inclines 23, and three drops 24, and these inclines and drops coöperate with the noses 22 of the power levers. Thus any rotation of the carrying wheels 10 in the direction indicated by the arrow in Fig. 1 will cause the gradual retraction of the coöperating power lever and the consequent winding up of the springs 21 until the drops 24 pass underneath the noses 22 whereupon the spring 21 immediately moves the power levers in toward their carrying wheels.

Pivotally mounted upon each power lever 20 upon a screw 30 is a carrying pawl 31 which is sufficiently off-set to coöperate with the 30-toothed gear 11 of the carrying wheel next to the left. A tension spring 32 has its one end fastened to the carrying pawl 31 and its other end to the power lever 2. It will thus be seen that the retraction of the power lever and the subsequent return of same caused by the rotation of a carrying wheel will result in the moving forward of the next higher carrying wheel one step. So far the mechanism is old and well-known in the art. Besides the above, however, there is present in this totalizer another set of power levers, namely the subtracting power levers 40, mounted upon the power lever shaft 3. These power levers 40 are absolutely identical in shape with the adding power levers, and are also each provided with a spring 41, a nose 42, a screw, 50, and a carrying pawl 51, all of the said parts being similarly shaped to the parts upon the adding power levers. Their operation also is similar, except that the noses 42 of the subtracting power lever coöperate with the 3-lobed subtracting carrying cams 13. These subtracting carrying cams are also provided with inclines 43 and drops 44, similarly shaped and for the same purpose as the inclines and drops upon the adding carrying cams.

Of course it is impossible for the machine to add and subtract at the same time and it was therefore necessary to provide mechanism to render only one set of power levers operative on the machine at one time. This mechanism consists of a reversing bar 60 mounted in the framework of the machine, and has extending therefrom two blades 61 and 62. The blade 61 coöperates with the adding power levers and the blade 62 with the subtracting power levers. An examination of Fig. 1 will show that each adding power lever is provided with a finger 63 and that each carrying pawl is provided with a finger 64, both fingers being supplied for coöperation with the blade of the reversing bar 60. Fig. 1 shows the reversing bar in a position where the blade 62 is in contact with the fingers 63 and 64 upon the subtracting power levers and carrying pawls. The pawls are thus held out of the way of the teeth of the carrying wheels and simultaneously the power levers are held with their noses out of the way of the subtracting carrying cams. The adding power levers and the carrying pawls are not in contact with the blade 61 and are therefore not interfered with. The rotation of the carrying wheels in an adding direction will therefore not be interfered with, and the mechanism will therefore function to carry in the proper manner. Moreover, any attempt to rotate the carrying wheels in a subtracting direction will be opposed by the adding carrying pawls.

Should the reversing bar 60 be rotated on its axis into its symmetrical position with its blade 61 in contact with the adding pawls and power levers and pawls, then the totalizer would thereby be placed in condition to subtract. An examination of the mechanism will show that the reversal of the reversing bar 60 results first in the retraction of the carrying pawls 31 from the teeth of the carrying wheels and the subsequent retraction of both the carrying pawls and the power levers from the carrying wheels. Again, reversely, when the reversing bar is removed, allowing the pawls and power levers to approach their carrying wheels, then first the power levers approach, and second the carrying pawls enter into the teeth of the carrying wheels. By this means, there is obviated any tendency on the part of the carrying pawls to move the carrying wheels during the change of the mechanism from addition to subtraction.

The application thus far has described a carrying wheel with two oppositely disposed cams forming an integral part thereof. Of course it is not necessary that these cams both be part of one wheel. It is quite possible to place one cam upon one wheel and the other cam upon another wheel, say, one that is continually in mesh with the first. This and other such modifications I call mechanical equivalents.

It will be noticed that the reversing bar is supported in the framework of the machine and not in the totalizer framework. This is because the reversing bar is ordinarily made long enough to reach over more than one totalizer. It thus serves to put all of said totalizers simultaneously in either adding or subtracting condition. But to accomplish this purpose of simultaneously placing all of the totalizers in adding or subtracting condition, it is not necessary to have the reversing bar itself stationary in the framework. The same result might be accomplished by mounting in each totalizer a short bar for that particular totalizer and to provide each of said bars with a projection, whereby it might be operated on by a manually manipulatable reversing bar long enough to coöperate with all of said projections in any of their positions. By this means it is possible to so construct the parts that there will be no actual contact, and therefore no friction between the totalizer and the reversing bar, even if they have movement relative to each other during the operation of the machine.

In order to reverse the calculation of the machine, it is necessary to change the direction of rotation of the carrying wheels of the totalizer. In the patent cited above, this is accomplished by reversing the direction of rotation of the master wheel which drives the totalizer wheels, by shifting the handle from one position to another. It is evident that the same handle that governs the rotation of the master wheel may also be made to govern the position of the reversing bar and thus both the master wheel and the reversing bar may be simultaneously placed in their adding positions or in their subtracting positions without any special manipulation for each independently.

I claim—

1. In a totalizer: a lower carrying wheel; a higher carrying wheel, two oppositely-disposed cams upon the lower carrying wheel; two power levers, one for each of said cams; an incline and drop upon each cam, each incline and drop coöperating with its power lever to thereby store up energy during the non-carrying period of the lower carrying wheel and to release the energy during the carrying period; transmitting mechanism supported on each power lever to carry the higher carrying wheel; a manually-operable reversing bar having two alternative positions and coöperating with said power levers and said transmitting mechanism to render only a predetermined one of said cams operative at one time; and means to render the transmitting mechanism associated with the inoperative cam inoperative on said higher carrying wheel during the passage of said reversing bar to its alternative position.

2. In a totalizer: a lower carrying wheel; a higher carrying wheel; two oppositely-disposed cams upon the lower carrying wheel; two power levers, one for each of said cams; an incline and drop upon each cam, each incline and drop coöperating with its power lever to thereby store up energy during the non-carrying period of the lower carrying wheel and to release the energy during the carrying period; a pawl supported on each power lever to carry the higher carrying wheel; a manually-operable reversing bar having two alternative positions and coöperating with said power levers and said pawls to render only a predetermined one of said cams operative at one time; and means to render the pawl associated with the inoperative cam inoperative on said higher carrying wheel during the passage of said reversing bar to its alternative position.

In witness whereof, I hereunto subscribe my name this 16th day of September, 1911, in the presence of two witnesses.

HYMAN ELI GOLDBERG.

Witnesses:
W. ELVANS SUMNER,
E. W. STOLZENBACH.